UNITED STATES PATENT OFFICE.

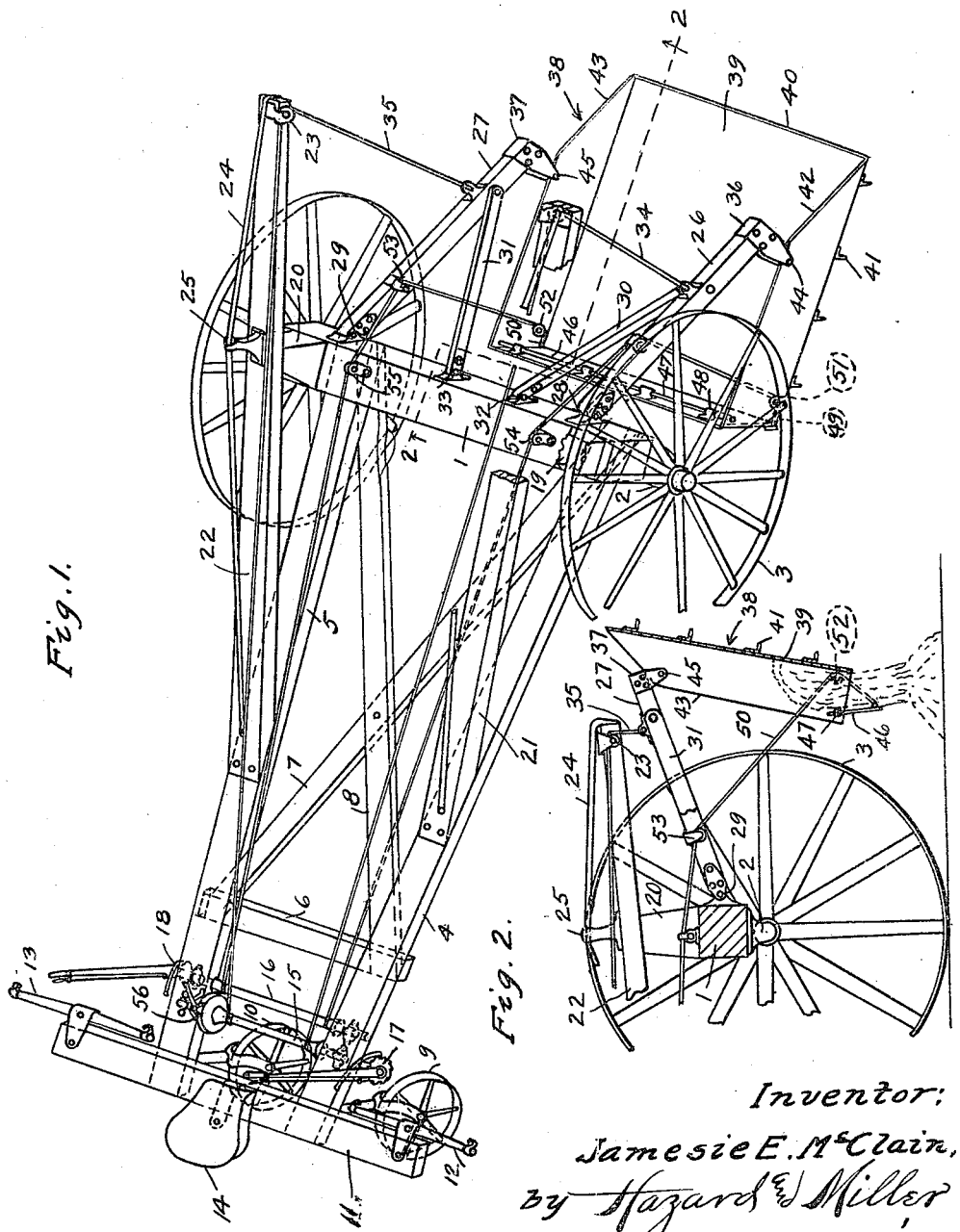

JAMESIE E. McCLAIN, OF TEMPE, ARIZONA.

DUMPING-SCRAPER.

1,271,485.

Specification of Letters Patent.

Patented July 2, 1918.

Application filed January 23, 1918. Serial No. 213,318.

*To all whom it may concern:*

Be it known that I, JAMESIE E. McCLAIN, a citizen of the United States, residing at Tempe, in the county of Maricopa and State of Arizona, have invented new and useful Improvements in Dumping-Scrapers, of which the following is a specification.

My object is to make an improved dumping scraper and my invention consists in the novel features herein shown, described and claimed.

Figure 1 is a perspective of a dumping scraper embodying the principles of my invention.

Fig. 2 is a fragmentary sectional detail on the line 2—2 of Fig. 1 and showing the parts in position to dump the load from the scraper, the parts being shown in scraping and loading position in Fig. 1.

The bolster 1 is mounted upon the front axle 2, said axle 2 being supported by large wheels 3. The reaches 4 and 5 extend backwardly from the ends of the bolster 1 and are rigidly connected by the cross piece 6 and diagonal braces 7 and 8. Caster wheels 9 and 10 support the rear bolster 11, said bolster being rigidly secured to the rear ends of the reaches 4 and 5 and said rear bolster serving as a doubletree, there being swingletrees 12 and 13 connected to the outer ends of the bolster, said outer ends extending laterally beyond the reaches 4 and 5 more than half the length of the swingletrees.

The operator's seat 14 is mounted upon the central portion of the bolster 11, the elevating shaft 15 is mounted transversely upon the reaches 4 and 5 directly in front of the operator's seat 14, and the dumping shaft 16 is mounted a short distance in front of the shaft 15 and parallel therewith, there being a pawl and ratchet and hand-lever mechanism 17 upon the right-hand end of the shaft 15 and a second pawl and ratchet and hand-lever mechanism 18 upon the left-hand end of the shaft 16, the hand-levers being within reach of the operator upon the seat 14.

Pillow blocks 19 and 20 are rigidly mounted upon the outer ends of the bolster 1, and sills 21 and 22 are fixed to the reaches 4 and 5 near their centers and extend forwardly and upwardly, the central portions of the sills resting upon the blocks 19 and 20, and pulleys 23 are mounted in the extreme forward ends of the sills 21 and 22. Trusses 24 are connected to the ends of the sills 21 and 22 and pass over struts 25 to assist in supporting the forward ends of the sills.

The lifting levers 26 and 27 are connected to the front side of the bolster 1 by hinges 28 and 29, and braces 30 and 31 are connected at their forward ends to the levers 26 and 27 near the forward ends of said levers, and said braces are connected at their rear ends to the front ends of the bolster 1 by hinges 32 and 33. Cables 34 and 35 are connected to the levers 26 and 27 near their foward ends and extend upwardly over the pulleys 23 and backwardly to the shaft 15, and the rear ends of the cables are connected to and wound upon the shaft so that the levers 26 and 27 may be raised or allowed to lower by manipulating the hand-lever mechanism 17.

The brackets 36 and 37 are fixed to the extreme forward ends of the levers 26 and 27 and the scraper pan 38 is connected to these brackets. The details of the scraper pan 38 are as follows: The rectangular bottom plate 39 has a straight forward cutting edge 40 and has angle iron ribs 41 extending across its bottom and has sides 42 and 43 extending upwardly from its side edges. The brackets 36 and 37 are connected to the sides 42 and 43 somewhat in front of the longitudinal centers by pins 44 and 45. The end gate 46 is pivotally mounted upon a rod 47 extending through clips 48 secured to the front face of the end gate and through the rear upper corners of the sides 42 and 43. Cables 49 and 50 are secured to the lower corners of the pivoted end gate 46 and pass forwardly under pulleys 51 and 52 secured to the inner faces of the side pieces 42 and 43, and then upwardly over pulleys 53 secured to the inner faces of the levers 26 and 27 near their rear ends, then backwardly over pulleys 54 and 55 mounted upon the bolster 1, and then backwardly to the shaft 16, the ends of the cables being attached to and wound upon the shaft 16 so that by manipulating the hand-lever mechanism 18 the pivoted end gate 46 may be closed or allowed to open. The end gate 46 is a heavy rectangular sheet metal plate and projects downwardly to engage the rear edge of the bottom plate 39 so that tension upon the cables 49 and 50 will swing the end gate to its vertical position and not farther.

In the practical operation, the draft animals will be hitched to the swingletrees 12 and 13 so as to travel one upon each side of the frame formed by the reaches 4 and 5 with their heads toward the wheels 3, so as to push the scraper pan 38. The hand-levers 17 and 18 are manipulated to allow the pan 38 to descend so that the edge 40 will scoop up the dirt and pass it on to the plate 39, and when the pan has been sufficiently loaded the hand-lever mechanism 17 is manipulated to pull upon the cables 34 and 35 and raise the levers 26 and 27, thereby raising the pan 38 bodily from the ground. The forward part of the pan will raise faster than the rear part due to the difference in the arc traveled by the pulleys 53 relative to the arc traveled by the pins 44 and 45. When the load in the pan has been transported to the desired position, the hand-lever mechanism 18 is operated to release the cables 49 and 50 and the load sliding backwardly and downwardly upon the plate 39 against the lower edge of the pivoted end gate 46 will cause the end gate to swing upon the rod 47 and open to discharge the dirt.

The bolster 1, the reaches 4 and 5, the cross bar 6, the braces 7 and 8, and the bolster 11 constitute the bed or frame of the running gear and this bed supported upon the axle 2, the wheels 3, and the casters 9 and 10 constitutes the running gear. The sills 21 and 22 extending forwardly and upwardly from the bolster 1 constitute a derrick, and the levers 26 and 27 pivoted to the bolster 1 and connected to the derrick by cables 34 and 35 constitute lifting levers for raising the load in the pan.

The pedal brake mechanism 56 upon the shaft 15 serves to ease the load down when the ratchet mechanism 17 is released.

Various changes may be made in the details of construction without departing from the spirit of my invention as claimed.

I claim:

1. In a dumping scraper, a running gear, a derrick extending forwardly from the running gear, lifting levers pivotally connected to the running gear and extending forwardly below the derrick, a scraper pan having its forward part connected to the forward ends of the lifting levers, a pivoted gate at the rear side of the pan, cables connected to the forward ends of the lifting levers, means for operating the cables, second cables connected to the pivoted gate and extending under pulleys on the sides of the pan and over pulleys upon the running gear, and means for operating the second cables.

2. In a dumping scraper, a running gear having a front bolster, a derrick extending forwardly from the running gear, lifting levers pivotally connected to the front bolster and extending forwardly below the derrick, a scraper pan having its forward part pivotally connected to the forward ends of the lifting levers, a pivoted gate at the rear side of the pan, cables connected to the forward ends of the lifting levers and extending upwardly over pulleys in the derrick and to the rear end of the running gear, an elevating shaft at the rear end of the running gear upon which the cables are attached and wound, second cables connected to the pivoted gate and extending under pulleys on the sides of the pan, over pulleys upon the running gear, and backwardly to the rear end of the running gear, and a dumping shaft at the rear end of the running gear to which the cables are attached.

In testimony whereof I have signed my name to this specification.

J. E. McCLAIN.

Copies of this patent may be obtained for five cents each, by addressing the "Commissioner of Patents, Washington, D. C."